P. SALTMAN.
CLOTH CUTTING MACHINE.
APPLICATION FILED NOV. 23, 1911.
1,062,529.
Patented May 20, 1913.
2 SHEETS—SHEET 1.
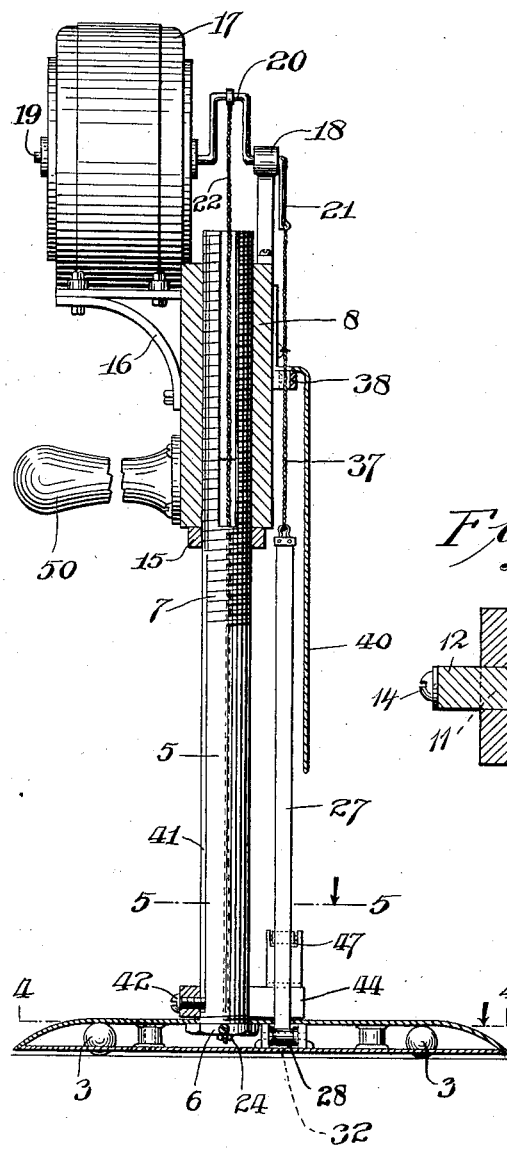
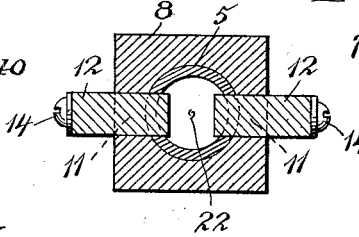
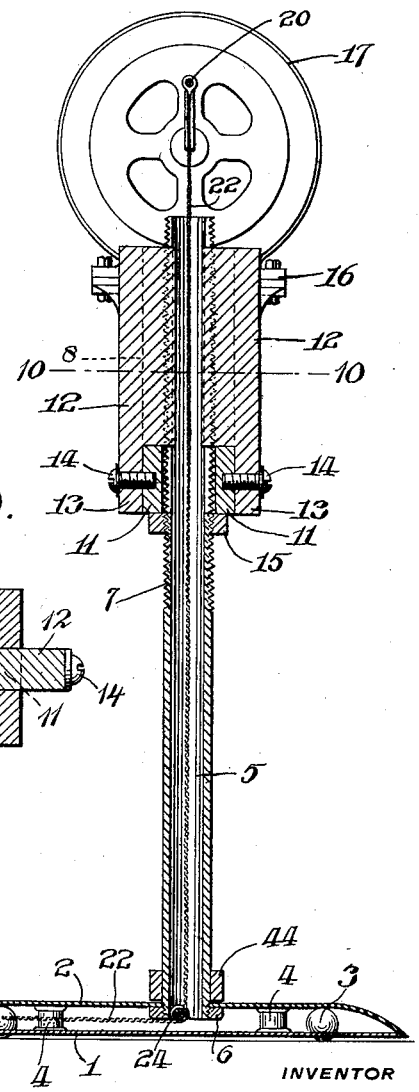
WITNESSES
INVENTOR
BY
ATTORNEY P. SALTMAN.
CLOTH CUTTING MACHINE.
APPLICATION FILED NOV. 23, 1911.
1,062,529.
Patented May 20, 1913.
2 SHEETS—SHEET 2.
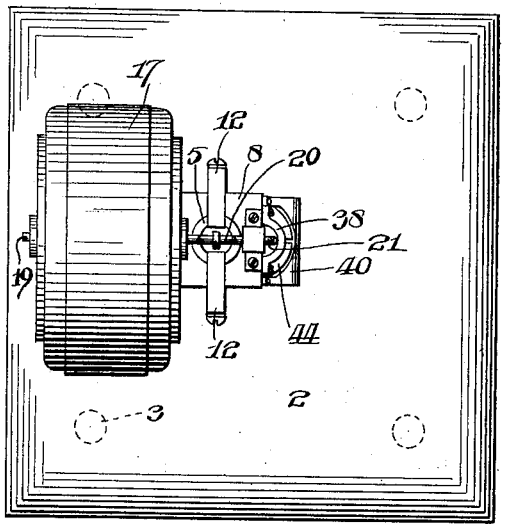
Fig. 3.
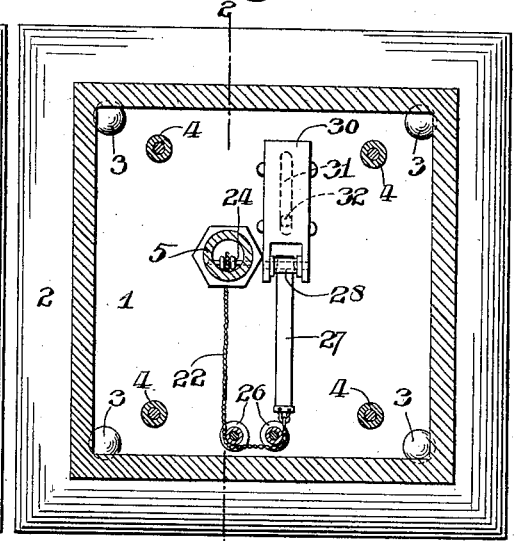
Fig. 4.
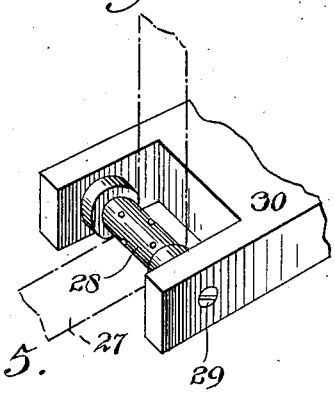
Fig. 6.
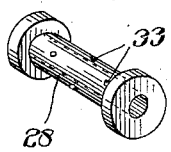
Fig. 7.
Fig. 8.
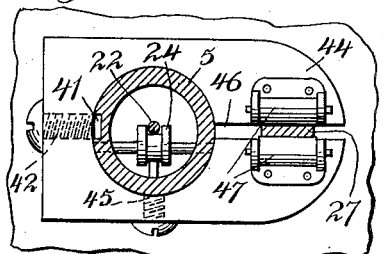
Fig. 5.
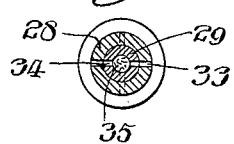
Fig. 9.
WITNESSES
Walter D Raymond
Robert J Watt
INVENTOR
Philip Saltman,
Walter W Calmore
ATTORNEY
COLUMBIA PLANOGRAPH CO., WASHINGTON, D. C.

UNITED STATES PATENT OFFICE.

PHILIP SALTMAN, OF PHILADELPHIA, PENNSYLVANIA, ASSIGNOR OF ONE-FIFTH TO DAVID BLUMBERG, ONE-FIFTH TO WILLIAM FORMAN, ONE-FIFTH TO ISIDOR GREEN, AND ONE-FIFTH TO LOUIS GREENBERG, ALL OF PHILADELPHIA, PENNSYLVANIA.

CLOTH-CUTTING MACHINE.

1,062,529.  Specification of Letters Patent.  Patented May 20, 1913.

Application filed November 23, 1911. Serial No. 661,959.

*To all whom it may concern:*

Be it known that I, PHILIP SALTMAN, citizen of the United States, residing at Philadelphia, in the county of Philadelphia and State of Pennsylvania, have invented certain new and useful Improvements in Cloth-Cutting Machines, of which the following is a specification.

The object of the invention is to provide a cloth cutting machine, including a flexible ribbon-like cutting blade arranged on a portable stand whereby, instead of feeding the cloth to the cutting machine, the cutting machine may be fed into a pile of cloth, or other material, to cut the same on either straight or curved lines.

Another object of the invention is to mount the machine in such manner that it may be quickly advanced, retracted, or returned in any direction in its plane of travel, making the invention particularly adapted to cutting out irregular shapes.

Another object of the invention is to adjustably mount the motor for operating the flexible cutting blade so that proper tension may be given the cutting blade by adjusting the position of the motor. And a further object of the invention is to provide means for keeping cool the roller around which the flexible cutting blade passes.

Reference will be had to the accompanying drawings forming a part of this specification and wherein like numerals of reference designate corresponding parts throughout the several views, in which:

Figure 1 is a view in side elevation, parts being illustrated in vertical section, Fig. 2 is a similar view taken on line 2—2 of Fig. 4, Fig. 3 is a top plan view, Fig. 4 is a sectional view on the line 4—4 of Fig. 1, Fig. 5 is a sectional view on the line 5—5 of Fig. 1, Fig. 6 is a detail view of the guide roller for the cutting knife mounted in its support, Fig. 7 is a perspective view of the guide roller unmounted, Fig. 8 is a perspective view of the hollow perforated shaft for the guide roller unmounted, and Fig. 9 is a vertical sectional view through the guide roller and pin assembled, showing absorbent material within the shaft. Fig. 10 is a sectional view taken on line 10—10 of Fig. 2.

The invention comprises a base consisting of lower and upper plates 1 and 2 connected together at their marginal edges and spaced from each other to provide a housing for parts to be later disclosed. Between these plates at intervals are arranged balls 3, with their upper portions bearing against the said upper plate 2 and their lower portions projecting through apertures formed in the lower plate 1 and providing bearing supports for moving the invention over the work-surface. As the diameter of the balls is greater than the space between the two plates, the balls cannot become displaced. Posts 4 maintain the spaced relation of the plates.

The upper plate 2 is centrally apertured to receive the lower end of a tubular standard 5, said standard being secured thereto in any suitable manner, though being preferably threaded in a nut portion 6 thereof so as to permit removal. The upper portion 7 of the standard 5 has diametrically opposite longitudinal slots and is provided with screw threads, upon which threaded end of the standard is arranged a head block 8. This head block is provided with a central longitudinal bore to receive the standard 5, and is further provided with diametrically opposite longitudinal slots open at the upper end of the head block, but closed at their lower ends by portions 11 of the head block 8. Within these slots are arranged diametrically opposite side or key blocks 12 which are cut at their lower ends to provide arms 13 by means of which and screws 14 the side or key blocks 12 are secured to the portions 11 of the head block 8. This construction permits the head block to be adjusted vertically on the upper end of the standard, the side or key blocks 12 sliding in the slots of the standard and preventing rotation of the head block. A nut 15 regulates the height at which the head block is held and it may be set at various points along the threaded portion 7 of the standard to regulate the tension given the cutting blade.

Secured to the side of one of the furcations of the head block, is a bracket 16 upon which is mounted a motor 17 of any approved type, and secured to the other furcation of the head block is a bracket bearing 18 in which is journaled an axial portion of the motor shaft 19. The said shaft is provided with a pair of cranks 20 and 21, the former being located between the bearing 18 and the motor and disposed directly above the bore of the standard 5, and the latter is disposed on the outer side of the bearing 18. A flexible cord 22 has pivotal connection at its upper end with the crank portion 20 and extends downwardly through the bore of the standard. At its lower end, the standard is provided with a pulley 24 around which the said cord 22 passes. The cord 22 then passes between the plates 1 and 2, around pulleys 26, and is connected with one end of a flexible ribbon-like cutting knife 27. This knife passes around a roller 28 which is spool-shaped and is journaled by means of a pintle 29 in an adjustable block 30. This block 30 is arranged between the plates 1 and 2 of the base and is slotted as at 31 and through this slot extends an adjusting screw 32; furthermore, one end of this block is bifurcated to accommodate the said roller 28. The said pintle 29 has one end threaded in one of the furcations of the block 30 and the other end unthreaded in the other of said furcations, a slot being provided in the latter end of the pintle to facilitate assembling.

Both the roller 28 and pintle 29 are perforated radially as indicated by reference numerals 33 and 34 respectively, in Figs. 7 and 8, and the pintle is further made hollow to receive absorbent material 35 whereby the roller 28 may be supplied with water or lubricating material to prevent over-heating. The water or lubricant is supplied to the absorbent material and passes through the perforations 34 to the bearing faces of the roller and pintle and further issues from the perforations 33 in the roller to counteract the bad effect of slippage that takes place between the knife 27 and the roller 28.

From the roller 28, the knife 27 passes upwardly beside the standard 5 and at its upper end is attached to another flexible cord 37 which has its upper end connected with the other crank 21 in a manner similar to that in which the cord 22 is connected to the crank 20. Secured to the side of one of the furcations of the head block 8, is a guide 38 which is apertured and through which aperture passes the said cord 37. A guard 40 is attached to the head block 8 adjacent the guide 38 and extends downwardly beside the knife 27 to protect the operator from injury from the knife.

The standard 5 is grooved longitudinally as at 41 and in this groove slides a guide pin 42 of a presser block 44. This presser block may be adjusted vertically on the standard 5 to suit the thickness of the pile of cloth that is to be cut, the cloth being held between said presser block and the plate 2 of the base. When so adjusted, the presser block is held by means of a detent 45, represented in Fig. 5 by dotted lines as being a spring detent of any approved type. A slot 46 is provided in the presser block to accommodate the knife 27 and the portion of the presser block on each side of the slot is supplied with a roller 47. It will be observed that the block 44 may be adjusted to accommodate a single thickness of cloth or a large pile.

In use, the machine is rolled over the work surface to the pile of cloth to be cut, the balls 3 permitting this to be done quickly. The base of the machine is pushed beneath the pile of cloth and as the operation of cutting progresses, the peculiar shape of the base will permit the base to feed its way between the cloth and the work surface without hindrance and at the same time will lift the pile of cloth into the plane of the knife. The motor being in motion, the cranks 20 and 21 thereof, through the medium of the cords 22 and 37 will cause the flexible knife to reciprocate endwise and to consequently cut the cloth. By means of the handle 50, the machine may be guided to cause the knife to cut either on straight or curved lines, the rollers 3 permitting quick turning of the machine. If the knife becomes too slack or tight, this may be compensated for by the adjusting nut 15.

Having fully described in the invention, what is claimed is:

1. A cloth cutting machine, comprising a tubular standard, a head having an opening slidingly receiving the standard, said head and standard being slotted, a key block secured to the head and arranged in the slots of the head and standard to prevent rotation of the head, means for holding the head in an adjusted position on the standard, a flexible cutting element passing through the standard and along-side of the same, and operating means for the flexible cutting element mounted on said head.

2. A cloth cutting machine, comprising a tubular standard, a head having an opening slidingly receiving the standard, said head and standard being oppositely slotted, key blocks detachably secured to the head and arranged in the slots of the head and standard to prevent rotation of the head, a nut threaded on the standard for adjusting the head, a flexible cutting element passing through the standard and along-side of the same, and operating means for the flexible element mounted on said head and movable therewith.

3. A cloth cutting machine, comprising a standard and a base therefor, a flexible cutting element extending from the base alongside of the standard, operating means for said element, a slotted cloth holding member adjustable on the standard, and rollers carried by the cloth holding member and being arranged on opposite sides of the said slot, said cutting element passing through the slot in said cloth holding member and between said rollers.

4. In a cloth cutting machine, a hollow base, a tubular standard, a headblock vertically adjustably mounted on the upper end of the standard, means between the headblock and the standard for preventing rotation of the former, a cutting element passing through the standard through the hollow base and alongside the standard with the latter portion radially disposed relatively to the standard, a motor mounted on the headblock and having a shaft disposed diametrically above the standard, said shaft having cranks, one alined with the cutter section that extends through the standard and the other alined with the cutter section that extends alongside the standard, and the cutter sections being connected with the respective alined cranks.

In testimony whereof I affix my signature in presence of two witnesses.

PHILIP SALTMAN.

Witnesses:
C. MERVYN GRAHAM,
WALTER W. CALMOSE.

Copies of this patent may be obtained for five cents each, by addressing the "Commissioner of Patents, Washington, D. C."